United States Patent
Nishimura

(10) Patent No.: US 8,264,271 B2
(45) Date of Patent: Sep. 11, 2012

(54) LOAD DRIVING APPARATUS

(75) Inventor: Tsuguo Nishimura, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 101 days.

(21) Appl. No.: 12/990,695
(22) PCT Filed: Jun. 4, 2009
(86) PCT No.: PCT/JP2009/060258
§ 371 (c)(1), (2), (4) Date: Nov. 2, 2010
(87) PCT Pub. No.: WO2009/148122
PCT Pub. Date: Dec. 10, 2009

(65) Prior Publication Data
US 2011/0128065 A1 Jun. 2, 2011

(30) Foreign Application Priority Data
Jun. 4, 2008 (JP) .................................. 2008-146893

(51) Int. Cl. *H03K 17/296* (2006.01)
(52) U.S. Cl. ...................... 327/392; 327/520; 340/693.3
(58) Field of Classification Search ................ 340/693.3
See application file for complete search history.

(56) References Cited

U.S. PATENT DOCUMENTS

| 7,667,447 | B2 * | 2/2010 | Huang et al. ................. 323/285 |
| 2001/0026134 | A1 | 10/2001 | Fukumoto et al. | |
| 2003/0144779 | A1 | 7/2003 | Obayashi et al. | |

FOREIGN PATENT DOCUMENTS

| DE | 10138750 A1 | 2/2003 |
| DE | 10303439 A1 | 8/2003 |
| DE | 60125433 T2 | 10/2007 |
| JP | A-2007-244195 | 9/2007 |
| JP | A-2007-272798 | 10/2007 |
| JP | A-2007-289553 | 11/2007 |

OTHER PUBLICATIONS

International Search Report issued in Application No. PCT/JP2009/060258; Dated Sep. 8, 2009.
Office Action dated Jun. 27, 2012 issued in German Patent Application No. 11 2009 001 395.3 (with translation).

* cited by examiner

*Primary Examiner* — An Luu
(74) *Attorney, Agent, or Firm* — Oliff & Berridge, PLC

(57) ABSTRACT

Semiconductor relays switch power supplied from a power source to drive loads, and further detect current values of electric currents flowing through the loads. A control section intermittently turns ON the semiconductor relays via driving circuits, thereby limiting electric power consumption of the loads. Further, the control section calculates, based on the current values detected by the semiconductor relays, load electric power consumption of the loads, and estimated electric power consumption of the loads when the semiconductor relays are continuously ON, and allows a display section to display, as a value indicative of an energy-saving effect, an electric power amount difference i.e. a saved electric energy that is based on an electric power difference obtained by subtracting the load electric power consumption from the estimated electric power consumption.

9 Claims, 6 Drawing Sheets

FIG. 6

| | CONSUMPTION/EMISSION DURING PRESENT DRIVING | ENERGY-SAVING EFFECT |
|---|---|---|
| ELECTRIC POWER CONSUMPTION AMOUNT | 200Wh | 40Wh |
| FUEL CONSUMPTION | 10L | 2L |
| FUEL EXPENSE | 1000YEN | 200YEN |
| $CO_2$ EMISSION AMOUNT | 23kg | 4.6kg |

LOAD DRIVING APPARATUS

This application is the national phase under 35 U.S.C. §371 of PCT International Application No. PCT/JP2009/060258 which has an International filing date of Jun. 4, 2009 and designated the United States of America.

BACKGROUND

1. Technical Field

The present invention relates to a load driving apparatus for driving a load.

2. Description of Related Art

For example, a vehicle-mounted load driving apparatus is connected between a power source such as a generator or a battery, and a load such as a various lamp and a various motor, and includes a switching section for switching electric power supplied from the power source in order to drive the load. When the switching section is turned ON, power will be fed from the power source to the load via the load driving apparatus, and when the switching section is turned OFF, power will not be fed from the power source to the load.

In recent years, in consideration of environments and in order to keep vehicle fuel cost down, various energy-conservation (hereinafter referred to as "energy-saving") measures have been proposed. Further, as a switching section, a mechanical relay has been used conventionally, but a semiconductor relay is used nowadays. Thus, it is conceivable that instead of driving of loads by constant turning ON of a semiconductor relay (which will hereinafter be referred to as "normal driving"), energy-saving measures concerning a load driving apparatus include driving of load by appropriate switching of ON/OFF of a semiconductor relay (which will hereinafter be referred to as "energy-saving driving"), thereby reducing electric power supplied to the load, and consequently reducing electric power consumption of loads (hereinafter referred to as "load electric power consumption").

Actually, as a residual fuel amount of a vehicle is decreased, a total vehicle weight is reduced, thus improving fuel efficiency. However, when a residual fuel amount is small, a vehicle might run out of fuel before the vehicle reaches its destination, and therefore, a driver wastefully fills the vehicle up with fuel, resulting in fuel efficiency degradation.

In order to obviate such inconvenience, there is disclosed a refueling reference information providing method for providing to a driver, information indicative of a relation between a residual fuel amount of a vehicle and fuel efficiency (see Japanese Application Laid-Open No. 2007-272798). This information includes: a plurality of different refuel amounts; travelable distances of a vehicle when the vehicle is refueled by the respective refuel amounts; and expected fuel efficiency when the vehicle travels the distances.

Using the provided information as reference, the driver refuels the vehicle by an amount by which the driver will avoid running out of fuel before the vehicle reaches its destination without having to fill up the vehicle with fuel. As a result, the fuel efficiency of the vehicle is improved, which eventually promotes vehicle energy saving.

SUMMARY

For example, when a switching section associated with a lamp is intermittently turned ON, the lamp becomes darker as compared with a case where the switching section is continuously ON. Therefore, a driver who puts importance on load performance tends to avoid energy-saving driving. Furthermore, a driver who is not interested in environmental issues is less willing to carry out energy-saving driving. In other words, a conventional load driving apparatus has a problem that the apparatus has difficulty in promoting vehicle energy saving.

Accordingly, there is demand for a load driving apparatus capable of allowing a driver to willingly carry out energy-saving driving, and/or capable of increasing the possibility of allowing a driver to select a vehicle having an energy-saving function.

Actually, in the refueling reference information providing method described in Japanese Application Laid-Open No. 2007-272798, the expected fuel efficiency of a plurality of different refuel amounts is specifically provided, this allowing a driver to easily select a fuel amount by which the expected fuel efficiency is enhanced.

The present invention has been made in view of the above-described circumstances, and its main object is to provide a load driving apparatus that is formed to provide notification of a value concerning a difference between a load electric power consumption obtained when a switching section is intermittently turned ON and an estimated electric power consumption obtained when the switching section is continuously ON, thereby making it possible to specifically present a value indicative of an energy-conservation effect and to promote energy saving.

Another object of the present invention is to provide a load driving apparatus that is formed to calculate a value concerning a difference between a load electric power consumption and an estimated electric power consumption based on a detection result obtained by an electric current detection section for detecting a current value of an electric current flowing through a load, thereby making it possible to easily calculate, with a simple circuit configuration, a value indicative of an energy-conservation effect.

Still another object of the present invention is to provide a load driving apparatus that is formed to use a semiconductor relay having an electric current detection function, thereby making it possible to suppress an increase in the number of components.

Yet another object of the present invention is to provide a load driving apparatus that is formed to turn ON a switching section intermittently/continuously when a limitation receiving section has received electric power limitation/non-limitation, thereby allowing a user to freely perform switching between energy-saving driving and normal driving.

Still yet another object of the present invention is to provide a load driving apparatus that is formed to perform, when a ratio receiving section has received a duty ratio, PWM control on a switching section by using the received duty ratio, thereby allowing a user to freely increase/reduce electric power supplied to a load.

A load driving apparatus according to a first aspect is a load driving apparatus for driving a load, wherein the load driving apparatus includes: a switching section for switching electric power supplied to the load; intermittent control means for controlling and intermittently turning ON the switching section, associated with the load, so as to limit the electric power supplied to the load; calculation means for calculating a value concerning a difference between a load electric power consumption of the load associated with the switching section when the switching section is controlled by the intermittent control means, and an estimated electric power consumption of the load when the switching section is continuously ON; and notification means for providing notification of the value calculated by the calculation means.

A load driving apparatus according to a second aspect further includes an electric current detection section for detecting a current value of an electric current flowing through the load, wherein the calculation means calculates at least the load electric power consumption based on a detection result obtained by the electric current detection section.

A load driving apparatus according to a third aspect includes a semiconductor relay, wherein the semiconductor relay having a function of detecting a current value of an electric current flowing through the semiconductor relay itself serves as both of the switching section and the electric current detection section.

A load driving apparatus according to a fourth aspect further includes: a limitation receiving section for receiving limitation/non-limitation of electric power supplied to the load; and continuous control means for controlling and continuously turning ON the switching section, associated with the load, upon reception of non-limitation by the limitation receiving section, wherein the intermittent control means controls and intermittently turns ON the switching section, associated with the load, upon reception of limitation by the limitation receiving section.

A load driving apparatus according to a fifth aspect further includes a ratio receiving section for receiving a duty ratio used in performing PWM control, wherein the intermittent control means performs PWM control on the switching section by using the duty ratio received by the ratio receiving section.

In the first aspect, the switching section switches electric power supplied to the load, and the intermittent control means controls and intermittently turns ON the switching section associated with the load. As a result, the electric power supplied to the load is further limited as compared with a case where the switching section is continuously ON.

When the intermittent control means controls and intermittently turns ON the switching section (i.e., when energy-saving driving is carried out), the calculation means calculates a value concerning a difference between the load electric power consumption and estimated electric power consumption. Herein, the load electric power consumption refers to an actual electric power consumption of the load associated with the switching section controlled by the intermittent control means so as to be intermittently turned ON, and the estimated electric power consumption refers to an estimated electric power consumption of the load when this switching section is continuously ON (i.e., when normal driving is carried out).

Accordingly, the value calculated by the calculation means is equivalent to a value indicative of an energy-conservation effect (hereinafter referred to as an "energy-saving effect") resulting from the limitation of electric power supplied to the load. This value is, for example, an electric power difference obtained by subtracting the load electric power consumption from the estimated electric power consumption, an electric power amount difference obtained by temporal summation of this electric power difference, or an electricity expense, fuel cost or the like obtained based on the electric power difference or electric power amount difference.

The notification means provides notification of the value calculated by the calculation means. As a result, the value indicative of an energy-saving effect is specifically presented to a user of the load driving apparatus.

In the second aspect, the electric current detection section detects a current value of an electric current flowing through the load. This load is at least a load associated with the switching section controlled by the intermittent control means so as to be intermittently turned ON.

The calculation means calculates at least the load electric power consumption based on a detection result obtained by the electric current detection section, and calculates, based on the calculation result, a value concerning a difference between the load electric power consumption and estimated electric power consumption.

The load electric power consumption is easily obtained, for example, by multiplication of: a voltage value of a voltage applied to the load; a current value of an electric current flowing through the load (i.e., a detection result obtained by the electric current detection section); and an ON/OFF ratio (e.g., duty ratio) of the switching section. In other words, a value concerning a difference between the load electric power consumption and estimated electric power consumption (i.e., a value indicative of an energy-saving effect) can be easily calculated.

Further, the load driving apparatus of the present invention can be easily obtained by connecting an electric current detection section in series between a switching section included in a conventional load driving apparatus, for example, and a load. In other words, a value indicative of an energy-saving effect can be calculated by a simple circuit configuration.

Note that in order to perform overheat protection control of the switching section, for example, such an electric current detection section can also serve as an electric current detection section for detecting a current value of an electric current flowing through the switching section. In that case, the circuit configuration can be further simplified and reduced in size.

Actually, the calculation means may also calculate the estimated electric power consumption based on a detection result obtained by the electric current detection section. In that case, the estimated electric power consumption is easily obtained, for example, by multiplication of: a voltage value of a voltage applied to the load; and a current value of an electric current flowing through the load (i.e., a detection result obtained by the electric current detection section).

Alternatively, the calculation means may use, as the estimated electric power consumption, a fixed value given in advance based on an experiment, for example.

In the third aspect, the semiconductor relay having a function of detecting a current value of an electric current flowing through the semiconductor relay itself is used to implement the switching section and the electric current detection section.

In other words, the load driving apparatus of the present invention is equivalent to a circuit configuration in which a switching section included in a conventional load driving apparatus is replaced with the semiconductor relay having the electric current detection function, and therefore, the number of components does not change.

As a result, in the load driving apparatus of the present invention, an increase in the number of components can be suppressed, which can simplify a circuit configuration and achieve a size reduction. Accordingly, a cost increase, resulting from an increase in the number of components, an increase in complexity of the circuit configuration and an increase in size, can be suppressed.

If no semiconductor relay having the electric current detection function is used, the electric current detection section must be added to a conventional load driving apparatus, and therefore, the number of components increases.

In the fourth aspect, the limitation receiving section receives limitation/non-limitation of electric power supplied to the load.

Upon reception of non-limitation by the limitation receiving section, the continuous control means controls and continuously turns ON the switching section associated with the load. On the other hand, upon reception of limitation by the limitation receiving section, the intermittent control means controls and intermittently turns ON the switching section associated with the load.

In other words, upon reception of limitation by the limitation receiving section, energy-saving driving for driving the load by appropriately switching the ON/OFF of the switching section is carried out, and thus electric power supplied to the load is limited. On the other hand, upon reception of non-limitation by the limitation receiving section, normal driving for driving the load by keeping the switching section ON constantly is carried out, and thus electric power supplied to the load is not limited.

Generally, enhancement of an energy-saving effect and enhancement of load performance (e.g., lamp brightness, air-conditioning performance of an air conditioner, etc.) cannot be achieved concurrently. Therefore, the user uses, as reference, the notified value indicative of an energy-saving effect, so that energy-saving driving is carried out by operating the limitation receiving section when the highest priority is given to the enhancement of an energy-saving effect, and normal driving is carried out by operating the limitation receiving section when the highest priority is given to the enhancement of load performance. Accordingly, instead of haphazardly avoiding energy-saving driving, the user is allowed to determine, based on credible evidence, whether normal driving should be carried out or energy-saving driving should be carried out. When energy-saving driving, in particular, is carried out, the user can have a feeling of satisfaction in his or her active contribution to energy saving.

In the fifth aspect, the ratio receiving section receives a duty ratio used in performing PWM control.

The intermittent control means performs PWM control on the switching section by using the duty ratio received by the ratio receiving section.

Accordingly, when a low duty ratio is received by the ratio receiving section, a period of time during which the switching section is OFF is prolonged, thus reducing electric power supplied to the load. On the other hand, when a high duty ratio is received by the ratio receiving section, a period of time during which the switching section is ON is prolonged, thus increasing electric power supplied to the load.

Generally, enhancement of an energy-saving effect and enhancement of load performance (e.g., lamp brightness, air-conditioning performance of an air conditioner, etc.) cannot be achieved concurrently. Therefore, the user uses, as reference, the notified value indicative of an energy-saving effect, so that the duty ratio is reduced by operating the ratio receiving section when energy-saving driving is carried out while higher priority is given to the enhancement of an energy-saving effect, and the duty ratio is increased by operating the ratio receiving section when energy-saving driving is carried out while higher priority is given to the enhancement of load performance. Accordingly, instead of haphazardly avoiding energy-saving driving, the user is allowed to carry out energy-saving driving so as to achieve both of the energy-saving effect and load performance based on credible evidence.

In the case of using the load driving apparatus of the present invention, a user who has been notified of a value indicative of an energy-saving effect can have an actual feeling of achieving energy-saving driving, and eventually can have an actual feeling of contributing to environmental problem solution, an actual feeling of achieving lower electricity expense, fuel cost or the like, etc. Furthermore, the user has these actual feelings, and thus actively carries out energy-saving driving, and/or selects a vehicle, a facility or the like including the load driving apparatus of the present invention. As a result, the load driving apparatus of the present invention is capable of promoting energy saving, environmental protection, global warming prevention, etc.

Moreover, the salability of the load driving apparatus of the present invention is enhanced in that a value indicative of an energy-saving effect is specifically presented and a contribution is made to environmental measures. Accordingly, the salability of a vehicle, a facility or the like including the load driving apparatus of the present invention is also enhanced.

The above and further objects and features will more fully be apparent from the following detailed description with accompanying drawings.

BRIEF DESCRIPTION OF THE SEVERAL VIEWS OF DRAWINGS

FIG. 6 is a schematic diagram illustrating an example of a notification table displayed on a display section of the load driving apparatus according to Embodiment 3 of the present invention.

DETAILED DESCRIPTION

Hereinafter, the present invention will be described in detail with reference to drawings illustrating embodiments thereof.

Embodiment 1

Figure 1:
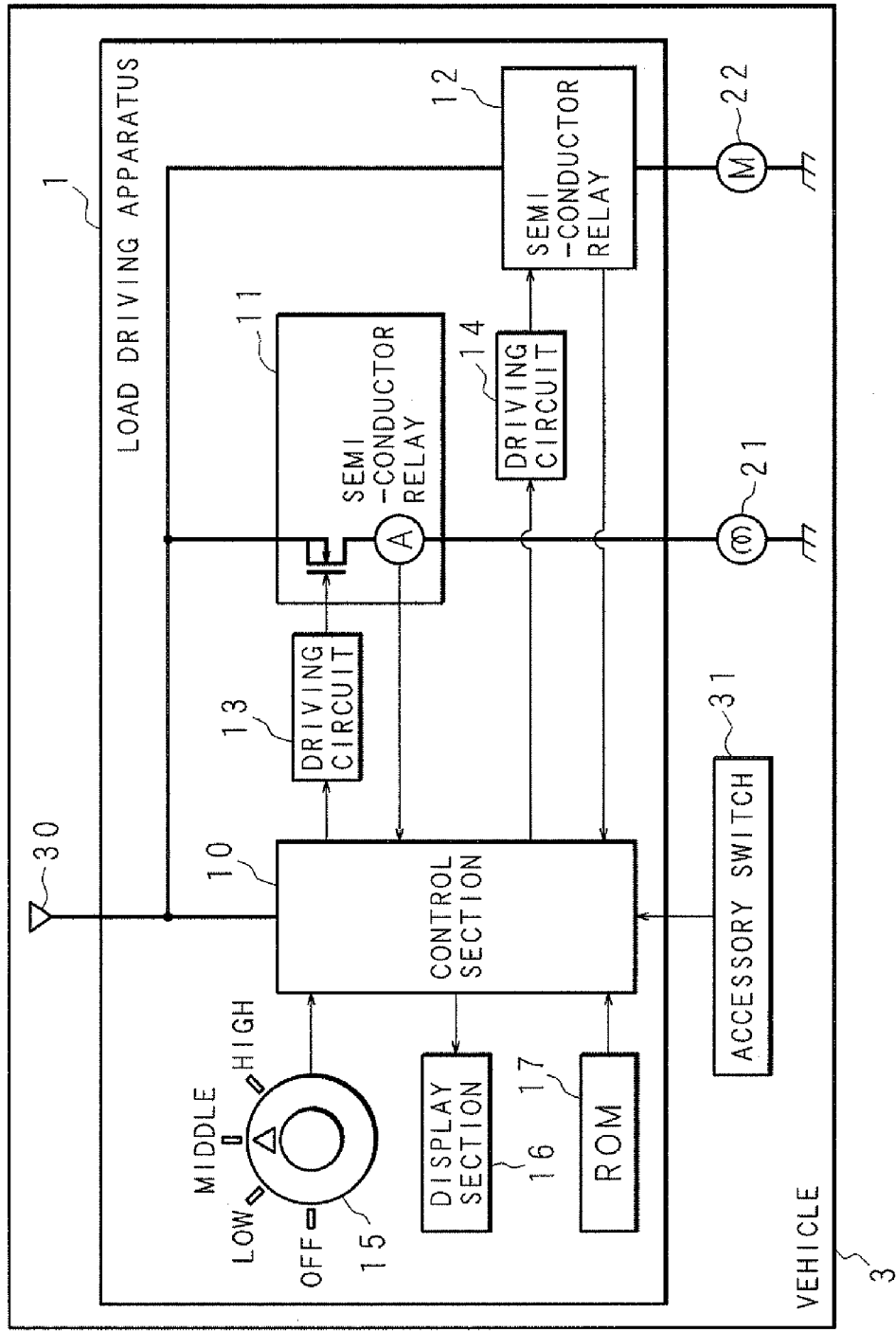
FIG. 1 is a block diagram illustrating a configuration of a load driving apparatus according to Embodiment 1 of the present invention.

FIG. 1 is a block diagram illustrating a configuration of a load driving apparatus 1 according to Embodiment 1 of the present invention.

The reference numeral 3 in the diagram represents a vehicle, and the vehicle 3 is equipped with: a plurality of loads 21 and 22 including a headlight, a blower of an air conditioner and a rear defogger; the load driving apparatus 1 for driving the loads 21 and 22; a power source 30 implemented by using a vehicle-mounted generator and a battery; and an accessory switch 31 for switching ON/OFF of power fed to the entire loads 21 and 22. Power is fed from the power source 30 to the loads 21 and 22 via the load driving apparatus 1.

The load driving apparatus 1 is an ECU including: a control section 10; semiconductor relays 11 and 12; driving circuits 13 and 14; an operation section 15; a display section 16; and a ROM 17, and is formed so that energy-saving driving for driving the loads 21 and 22 while limiting electric power supplied to the loads 21 and 22, and normal driving for driving the loads 21 and 22 while feeding power thereto without limitation are carried out in a switching manner. Details of the load driving apparatus 1 will be described below.

The control section 10 is the control center of the load driving apparatus 1, and is implemented by using: an A/D converter to which power is fed from the power source 30; and a microprocessor to which power is fed from the A/D converter. Further, the control section 10 has the functions of allowing various signals to be inputted/outputted from/to each section of the load driving apparatus 1, and detecting a voltage value of an inputted signal.

Moreover, the control section 10 has the function of detecting a voltage value of a voltage applied to the control section 10 by the power source 30. A voltage applied to the control section 10 by the power source 30 is equivalent to a voltage of the power source 30. This voltage value detection is repeatedly carried out at predetermined time intervals.

The semiconductor relays 11 and 12 are semiconductor relays each having an electric current detection function, and output current value detection results to the control section 10. More specifically, the semiconductor relays 11 and 12 function as switching sections for switching electric power supplied from the power source 30 to the loads 21 and 22, and function as electric current detection sections for detecting current values of electric currents flowing through the semiconductor relays 11 and 12 themselves.

The semiconductor relay 11 is connected in series between the power source 30 and the load 21, and electric power is supplied from the power source 30 to the load 21 when the semiconductor relay 11 is ON. The current value detected by the semiconductor relay 11 is equivalent to the current value of an electric current flowing through the load 21.

The semiconductor relay 12 is configured similarly to the semiconductor relay 11, and is connected in series between the power source 30 and the load 22. Therefore, electric power is supplied from the power source 30 to the load 22 when the semiconductor relay 12 is ON. The current value detected by the semiconductor relay 12 is equivalent to the current value of an electric current flowing through the load 22.

The semiconductor relays 11 and 12 and the control section 10 are connected in parallel with each other.

The driving circuits 13 and 14 each drive the associated one of the semiconductor relays 11 and 12. To this end, the respective driving circuits 13 and 14 output predetermined signals to the respective semiconductor relays 11 and 12, and also stop the output of these signals.

More specifically, the respective driving circuits 13 and 14 output continuous signals for continuously turning ON the respective semiconductor relays 11 and 12. Furthermore, the respective driving circuits 13 and 14 output intermittent signals for intermittently turning ON the respective semiconductor relays 11 and 12. Moreover, in order to continuously turn OFF the respective semiconductor relays 11 and 12, the respective driving circuits 13 and 14 completely stop the output of both of the continuous signals and intermittent signals.

The input and output of the respective continuous signals and intermittent signals are controlled by the control section 10. To this end, the control section 10 outputs either aftermentioned continuous control signals or intermittent control signals to the respective semiconductor relays 11 and 12.

Further, an intermittent signal duty ratio d (0<d<100[%]) is subjected to PWM control by the control section 10. Therefore, when the duty ratio d is changed, the control section 10 calculates the duty ratio d using the following equation (1), and gives the calculation result to the driving circuits 13 and 14.

$$d = \alpha \times d_O \quad (1)$$

In this equation, $d_O$ represents a basic value of the duty ratio, α represents a coefficient of the basic value $d_O$ (which will hereinafter be referred to as a ratio coefficient α), and one of three types of candidate values $\alpha_S$, $\alpha_M$ and $\alpha_W$ (0<$\alpha_S$<$\alpha_M$<$\alpha_W$<1) is used in accordance with an increase or decrease in the duty ratio d. When the duty ratio d is brought close to "0", a period of time during which the respective semiconductor relays 11 and 12 are OFF is prolonged to increase the degree of energy saving, but when the duty ratio d is brought close to "1", a period of time during which the respective semiconductor relays 11 and 12 are ON is prolonged to reduce the degree of energy saving.

The duty ratio basic value $d_O$ and the ratio coefficient candidate values $\alpha_S$, $\alpha_M$ and $\alpha_W$ are stored in advance in the ROM 17, and the present embodiment uses the following numerical values:
$d_O$=85.2
$\alpha_S$=0.5
$\alpha_M$=0.8
$\alpha_W$=1.0

These values are read from the ROM 17 by the control section 10 in calculating the duty ratio d.

In the present embodiment, the basic value $d_O$ and the candidate values $\alpha_S$, $\alpha_M$ and $\alpha_W$ are common to the loads 21 and 22, but the basic value $d_O$ and the candidate values $\alpha_S$, $\alpha_M$ and $\alpha_W$, which are different for each of the loads 21 and 22, may be stored in the ROM 17. Alternatively, the number of the candidate values may be two, or may be four or more.

Note that the present invention is not limited to the configuration in which the equation (1), the basic value $d_O$ and the candidate values $\alpha_S$, $\alpha_M$ and $\alpha_W$ are stored in the ROM 17. For example, for the duty ratio d, three types of candidate values $d_S$, $d_M$ and $d_L$ (=42.6, 68.16, and 85.2) may be stored in the ROM 17.

Furthermore, the equation (1), the following equation (2) for calculating the basic value $d_O$, and the candidate values $\alpha_S$, $\alpha_M$ and $\alpha_W$ may be stored in the ROM 17.

$$d_O = (V_O/V)^2 \quad (2)$$

In this equation, $V_O$ represents a reference voltage value determined in advance, and V represents a voltage value of the power source 30, which is detected by the control section 10. When the reference voltage value $V_O$=12[V] and the voltage value V=13[V], there is obtained the following equation: $d_O$=85.2.

Besides, the following equation (3) for calculating the duty ratio d, and candidate values $V_S$, $V_M$ and $V_L$ for the reference voltage value $V_O$ may be stored in the ROM 17.

$$d = (V_O/V)^2 \quad (3)$$

Alternatively, instead of the voltage value V, a voltage value of a voltage applied to each of the loads 21 and 22 may be used. In that case, using the equation (1), (2) or (3), the duty ratio d associated with each of the loads 21 and 22 is calculated.

The operation section 15 is implemented by using a dial switch, and is manually operated by a driver of the vehicle 3. When the operation section 15 is ON, a predetermined signal (hereinafter referred to as a "ratio setting signal") is outputted from the operation section 15 to the control section 10; furthermore, the operation section 15 is switched among three levels, i.e., "HIGH", "MIDDLE" and "LOW", thereby switching the voltage level of the ratio setting signal among three levels. On the other hand, when the operation section 15 is OFF, no ratio setting signal is outputted.

When the operation section 15 is switched to "HIGH" (or "LOW"), a high-voltage (or low-voltage) ratio setting signal is inputted to the control section 10. On the other hand, when the operation section 15 is switched to "MIDDLE", a ratio setting signal of an intermediate voltage level between a high voltage and a low voltage is inputted to the control section 10.

In the ROM 17, the high-voltage (or low-voltage) ratio setting signal is associated with the minimum candidate value $\alpha_S$ (or the maximum candidate value $\alpha_W$) of the ratio coefficient $\alpha$, and the intermediate-voltage ratio setting signal is associated with the intermediate candidate value $\alpha_M$ of the ratio coefficient $\alpha$.

The display section 16 is implemented by using a liquid crystal display panel, and is controlled by the control section 10, thereby displaying a numeral indicative of an energy-saving effect resulting from execution of energy-saving driving.

Figure 2:
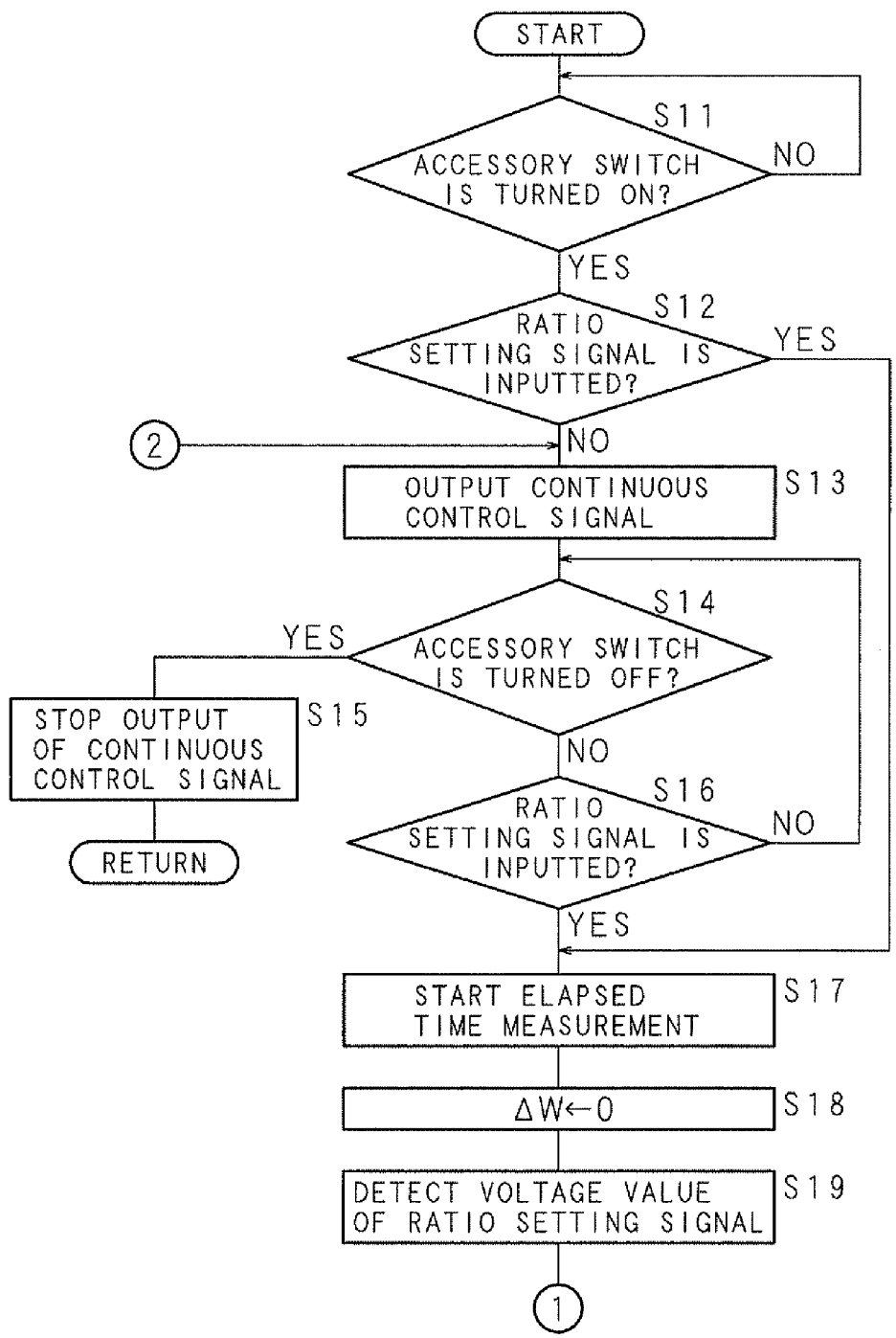
FIG. 2 is a flow chart illustrating a procedure of load driving processing carried out by the load driving apparatus according to Embodiment 1 of the present invention.
Figure 3:
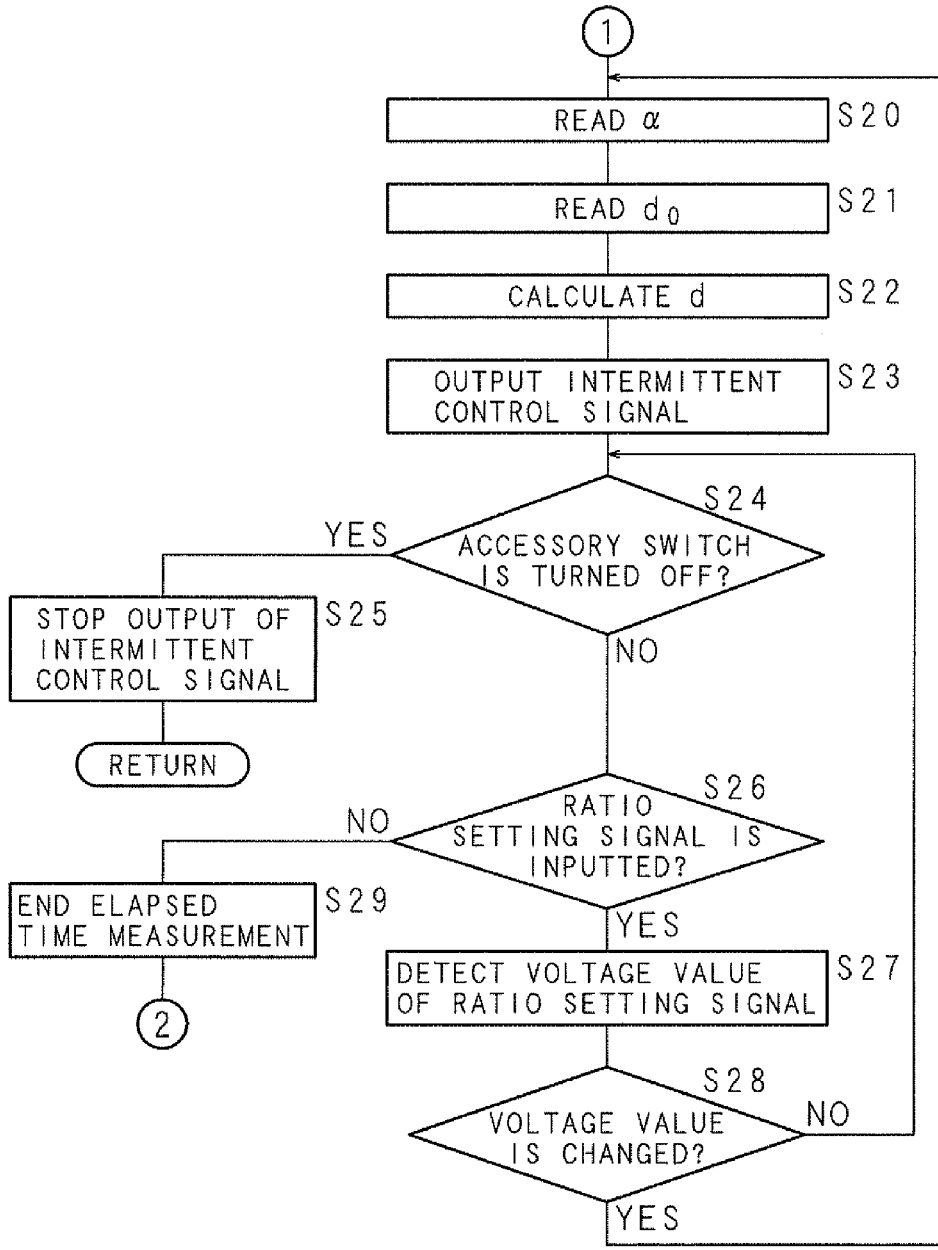
FIG. 3 is a flow chart illustrating the procedure of load driving processing carried out by the load driving apparatus according to Embodiment 1 of the present invention.

FIGS. 2 and 3 are flow charts illustrating a procedure of load driving processing carried out by the load driving apparatus 1 according to Embodiment 1 of the present invention.

The control section 10 determines whether or not the accessory switch 31 is turned ON(S11), and when the accessory switch 31 is kept OFF (NO in S11), the process of S11 is repeatedly carried out, so that upon turning ON of the accessory switch 31 (YES in S11), the process of S12 and subsequent processes are carried out.

The driver switches the operation section 15 to "HIGH" when the driver desires energy-saving driving that considerably limits electric power, switches the operation section 15 to "MIDDLE" when the driver desires energy-saving driving that moderately limits electric power, switches the operation section 15 to "LOW" when the driver desires energy-saving driving that slightly limits electric power, and switches the operation section 15 to "OFF" when the driver desires normal driving that does not limit electric power. In this case, the high-voltage, intermediate-voltage or low-voltage ratio setting signal is outputted to the control section 10 from the operation section 15, or no ratio setting signal is outputted therefrom.

The control section 10 determines whether or not the ratio setting signal has been inputted from the operation section 15 (S12). When no ratio setting signal has been inputted from the operation section 15 (NO in S12), the driver desires normal driving. Hence, the control section 10 outputs, to each of the driving circuits 13 and 14, a continuous control signal for carrying out normal driving (S13).

The driving circuits 13 and 14, to which the continuous control signals have been inputted from the control section 10, output continuous signals to the semiconductor relays 11 and 12. As a result, the semiconductor relays 11 and 12 will be continuously ON. In other words, the control section 10 in S13 functions as a continuous control means by using the driving circuits 13 and 14.

After the completion of the process of S13, the control section 10 determines whether or not the accessory switch 31 has been turned OFF (S14), and when the accessory switch 31 has been turned OFF (YES in S14), the control section 10 stops the output of the continuous control signals (S15) to return the procedure to S11. As a result, the semiconductor relays 11 and 12 will be continuously OFF.

When the accessory switch 31 is kept ON(NO in S14), the control section 10 determines whether or not the ratio setting signal has been inputted from the operation section 15 (S16). When no ratio setting signal has been inputted yet from the operation section 15 (NO in S16), the driver desires the continuation of operation of the continuous control means.

Hence, the control section 10 moves the procedure to S14 while continuing the output of the continuous control signals carried out in S13.

Upon input of the ratio setting signal from the operation section 15 when the continuous control signals are outputted (YES in S16), the driver desires switching from normal driving to energy-saving driving. Therefore, the control section 10 carries out the process of S17 and subsequent processes.

Upon input of the ratio setting signal from the operation section 15 when the continuous control signals and intermittent control signals are not outputted (YES in S12), the driver desires energy-saving driving. Therefore, the control section 10 carries out the process of S17 and subsequent processes.

The control section 10 uses an unillustrated timer or counts the number of clocks inputted to the control section 10, thus starting elapsed time measurement (S17). Furthermore, the control section 10 resets a variable $\Delta W$ to "0" (S18).

In this case, $\Delta W$ represents an electric power amount difference described later, and in the present embodiment, the electric power amount difference $\Delta W$ is used as a value indicative of an energy-saving effect resulting from the execution of energy-saving driving.

After the completion of the process of S18, the control section 10 detects a voltage value of the ratio setting signal inputted from the operation section 15 (S19), reads, as the ratio coefficient $\alpha$, one of the ratio coefficient candidate values $\alpha_S$, $\alpha_M$ and $\alpha_W$ from the ROM 17 based on the detection result (S20), and then reads the duty ratio basic value $d_O$ from the ROM 17 (S21).

In the process of S20, when the detected voltage value is less than a predetermined first voltage value (or greater than a predetermined second voltage value), the candidate value $\alpha_W$ (or the candidate value $\alpha_S$) is read as the ratio coefficient $\alpha$, and when the detected voltage value is equal to or higher than the first voltage value and is equal to or lower than the second voltage value, the candidate value $\alpha_M$ is read as the ratio coefficient $\alpha$.

After the completion of the process of S21, the control section 10 calculates, using the equation (1), the duty ratio d (S22), and outputs, to each of the driving circuits 13 and 14, an intermittent control signal indicative of the duty ratio d calculated in S22, with the aim of carrying out energy-saving driving (S23).

The driving circuits 13 and 14, to which the intermittent control signals have been inputted from the control section 10, output intermittent signals of the duty ratio d to the semiconductor relays 11 and 12. As a result, the semiconductor relays 11 and 12 are intermittently turned ON at an ON/OFF rate proportional to the duty ratio d. In other words, the control section 10 in S23 functions as an intermittent control means by using the driving circuits 13 and 14.

After the completion of the process of S23, the control section 10 determines whether or not the accessory switch 31 has been turned OFF (S24), and when the accessory switch 31 has been turned OFF (YES in S24), the control section 10 stops the output of the intermittent control signals (S25) to end the elapsed time measurement and then return the procedure to S11. As a result, the semiconductor relays 11 and 12 will be continuously OFF.

When the accessory switch 31 is kept ON(NO in S24), the control section 10 determines whether or not the input of the ratio setting signal from the operation section 15 is continued (S26). When the input of the ratio setting signal from the operation section 15 is continued (YES in S26), the driver desires the continuation of energy-saving driving. Therefore, the control section 10 detects the voltage value of the ratio setting signal inputted from the operation section 15 (S27), and determines whether or not the detection result has been changed from the previous detection result (S28); then, when the detection result has not been changed (NO in S28), the control section 10 moves the procedure to S24 while continuing the output of the intermittent control signals carried out in S23.

When the voltage value of the ratio setting signal inputted from the operation section 15 has been changed (YES in S28), the control section 10 returns the procedure to S20, and reads, as the ratio coefficient α, one of the ratio coefficient candidate values $α_S$, $α_M$ and $α_W$ from the ROM 17 based on the detection result obtained in S27. Thereafter, the process of S21 and subsequent processes are carried out, thereby performing PWM control on the semiconductor relays 11 and 12.

When the input of the ratio setting signal from the operation section 15 is stopped (NO in S26), the driver desires normal driving. Therefore, the control section 10 ends the elapsed time measurement (S29), and moves the procedure to S13.

The control section 10 carries out the above-described load driving processing, thus allowing the operation section 15 to function as a limitation receiving section and a ratio receiving section.

Figure 4:
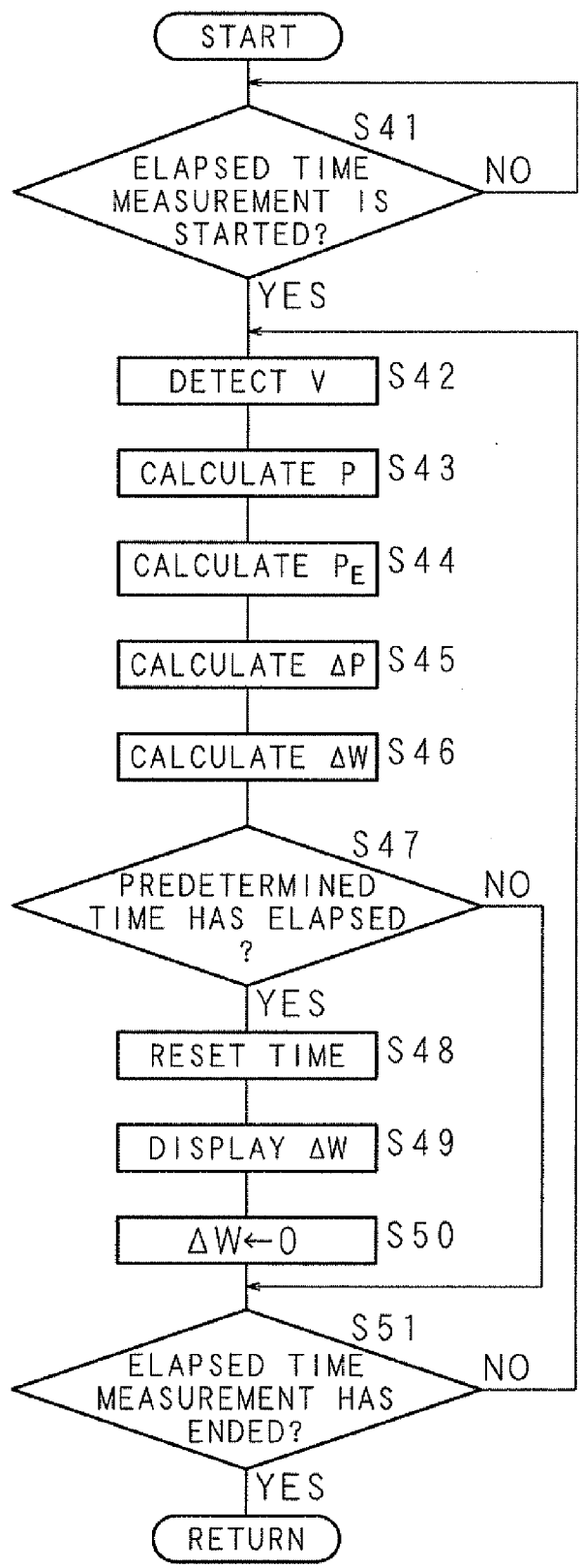
FIG. 4 is a flow chart illustrating a procedure of energy-saving effect notification processing carried out by the load driving apparatus according to Embodiment 1 of the present invention.

FIG. 4 is a flow chart illustrating a procedure of energy-saving effect notification processing carried out by the load driving apparatus 1 according to Embodiment 1 of the present invention.

The control section 10 determines whether or not the elapsed time measurement has been started by the process of S17 in the load driving processing (S41); then, when the elapsed time measurement has not been started (NO in S41), energy-saving driving has not been carried out, and therefore, the process of S41 is repeatedly carried out.

When the elapsed time measurement has been started (YES in S41), energy-saving driving has been carried out, and therefore, the control section 10 detects the voltage value V of the power source 30 (S42).

After the completion of the process of S42, the control section 10 calculates, using the following equations (4) to (6), a load electric power consumption P (S43), and subsequently calculates, using the following equations (7) to (9), an estimated electric power consumption $P_E$ (S44).

$$P_{21}=d \times V \times I_{21} \quad (4)$$

$$P_{22}=d \times V \times I_{22} \quad (5)$$

$$P=P_{21}+P_{22} \quad (6)$$

It is to be noted that $P_{21}$ and $P_{22}$ represent load electric power consumptions of the loads 21 and 22 when energy-saving driving is carried out, respectively, while $I_{21}$ and $I_{22}$ represent current values detected by the semiconductor relays 11 and 12, i.e., current vales of electric currents flowing through the loads 21 and 22, respectively.

$$P_{E21}=V \times I_{21} \quad (7)$$

$$P_{E22}=V \times I_{22} \quad (8)$$

$$P_E=P_{E21}+P_{E22} \quad (9)$$

It is to be noted that $P_{E21}$ and $P_{E22}$ represent estimated electric power consumptions of the loads 21 and 22 assuming that normal driving is carried out, respectively.

Actually, in order to accurately calculate the load electric power consumptions $P_{21}$ and $P_{22}$ and the estimated electric power consumptions $P_{E21}$ and $P_{E22}$, the voltage value of a voltage applied to each of the loads 21 and 22 should be used instead of using the voltage value V detected by the control section 10 in S42. However, it is difficult to directly detect the voltage value of a voltage applied to each of the loads 21 and 22, and furthermore, the voltage value V can be regarded as being approximately equal to the voltage value of a voltage applied to each of the loads 21 and 22. Accordingly, the load driving apparatus 1 according to the present embodiment uses the equations (4), (5), (7) and (8) by which the load electric power consumptions $P_{21}$ and $P_{22}$ and the estimated electric power consumptions $P_{E21}$ and $P_{E22}$ are calculated using the voltage value V.

After the completion of the process of S44, the control section 10 calculates, using the following equation (10), an electric power difference ΔP (S45), and calculates, using the following equation (11), the electric power amount difference ΔW (S46). Each of the electric power difference ΔP and the electric power amount difference ΔW is a positive value, and the electric power difference ΔP is increased by switching the operation section 15 from "LOW" to "MIDDLE" and from "MIDDLE" to "HIGH". The equation (11) serves as an equation for temporal summation of the electric power difference ΔP.

$$\Delta P = P_E - P \quad (10)$$

$$\Delta W = \Delta W + \Delta P \quad (11)$$

After the completion of the process of S46, the control section 10 determines whether or not a predetermined time (e.g., 10 minutes) has elapsed (S47); then, when the predetermined time has elapsed (YES in S47), the control section 10 resets the elapsed time measurement result to "0" (S48), allows the display section 16 to display the electric power amount difference ΔW calculated in S46 (S49), and resets the electric power amount difference ΔW to "0" (S50).

As a result, at predetermined time intervals (e.g., at intervals of 10 minutes), the display section 16 displays the electric power amount difference ΔW as a value indicative of an energy-saving effect resulting from the execution of energy-saving driving. The driver visually recognizes the electric power amount difference ΔW displayed on the display section 16, and thus has an actual feeling of achieving energy saving.

In other words, the control section 10 in S46 functions as a calculation means, and the control section 10 and the display section 16 in S49 function as a notification means.

After the completion of the process of S50 or when the predetermined time has not elapsed (NO in S47), the control section 10 determines whether or not the elapsed time measurement has ended by the process of S29 in the load driving processing (S51); then, when the elapsed time measurement has not ended (NO in S51), the execution of energy-saving driving is continued, and therefore, the procedure is returned to S42. When the elapsed time measurement has ended (YES in S51), the execution of energy-saving driving has ended, and therefore, the control section 10 returns the procedure to S41.

Note that the load driving apparatus 1 may allow the display section 16 to display the electric power difference ΔP calculated by the process of S45. Further, when the electric power amount difference ΔW or the electric power difference ΔP is displayed, the load driving apparatus 1 not only may display, using a numeral, a numerical value of the electric power amount difference ΔW or the electric power difference ΔP, but also may display the numerical value by using a line graph, a bar graph or the like, for example. In that case, the driver can grasp, for example, the magnitude or temporal change of the electric power amount difference ΔW or the electric power difference ΔP in a sensory manner.

Furthermore, instead of allowing the display section 16 to display the electric power amount difference ΔW or the electric power difference ΔP, the load driving apparatus 1 may convert the electric power of the electric power difference ΔP or the electric power amount of the electric power amount difference ΔW into, for example, an amount of fuel required on the assumption that power is generated by a vehicle-mounted generator, an expense of this fuel, or a travelable distance of the vehicle 3 when this fuel is used, and may allow the display section 16 to display the converted result. In that case, the driver can more easily grasp how much energy is saved by energy-saving driving. However, in order to convert the electric power amount difference ΔW or the electric power difference ΔP into an amount of fuel, an expense, etc., a coefficient, by which the electric power amount difference ΔW or the electric power difference ΔP is multiplied, is required. As this coefficient, a value obtained by an experiment, for example, is stored in the ROM 17 at the time of shipment from a factory.

Moreover, the load driving apparatus 1 may allow the display section 16 to display a value indicative of an energy-saving effect when the driver ends the driving of the vehicle 3.

The above-described load driving apparatus 1 is capable of notifying the driver of the electric power amount difference ΔW as a value indicative of an energy-saving effect. The electric power amount difference ΔW is obtained by temporal summation of the electric power difference ΔP that is a difference between the estimated electric power consumption $P_E$ and the load electric power consumption P; therefore, an energy-saving effect is grasped more easily as compared with a case where there is displayed, for example, the load electric power consumption P, a load electric power consumption amount obtained by temporal summation of the load electric power consumption P, an amount of fuel consumed to drive the loads 21 and 22, an expense of this fuel, or a travelable distance of the vehicle 3 when this fuel is used.

When energy-saving driving is carried out, the electric power consumption of the loads 21 and 22 is reduced in accordance with a reduction in electric power to be supplied thereto; hence, the energy-saving effect is enhanced, but the performance of the loads 21 and 22 (e.g., lamp brightness and/or motor rotation speed) is sacrificed. On the other hand, when normal driving is carried out, the electric power consumption of the loads 21 and 22 is increased in accordance with an increase in electric power to be supplied thereto; hence, it is possible to take full advantage of the performance of the loads 21 and 22, but energy saving cannot be achieved. To cope with this, the driver manually operates the operation section 15 using the notified electric power amount difference ΔW as reference, thereby making it possible to achieve both of the energy-saving effect and the performance of the loads 21 and 22, with an adequate balance maintained therebetween.

Besides, since the number of components of the load driving apparatus 1 including the semiconductor relays 11 and 12 is reduced, the manufacturing cost thereof can be reduced.

Note that the configuration of the load driving apparatus 1 is not limited to the configuration of the present embodiment. For example, the load driving apparatus 1 is not limited to one that is mounted on the vehicle 3. However, functions and effects of the load driving apparatus 1 are utilized in an effective manner especially when the load driving apparatus 1 is included in the vehicle 3.

Alternatively, for example, a configuration in which a plurality of the loads 21, 21, . . . are connected in series to the single semiconductor relay 11 may be provided. Optionally, the three or more loads 21, 22, . . . may be connected to the load driving apparatus 1; in that case, in accordance with increase in the numbers of the loads 21 and 22, the numbers of the semiconductor relays 11 and 12 and the numbers of the driving circuits 13 and 14 are also increased. Conversely, the single load 21 may be connected to the load driving apparatus 1. In that case, the semiconductor relay 12 and the driving circuit 14, which are not connected to the load 21, are unnecessary.

Moreover, instead of the semiconductor relays 11 and 12, a load driving apparatus 1 may include: FETs driven by the driving circuits 13, 14; and current sensors for detecting current values of electric currents flowing through the loads 21 and 22, and for outputting the detected current values to the control section 10. In that case, the number of components is increased, but other effects bear comparison with those of the load driving apparatus 1 according to the present embodiment.

Alternatively, instead of the control section 10 and the driving circuits 13 and 14, a load driving apparatus 1 may include a control section having a function of a driving circuit, and may be configured so that this control section directly drives the semiconductor relays 11 and 12. In that case, the number of components is further reduced.

Further, notification is not limited to that provided by the display section 16, but a configuration in which a notification is made by output of a message, a melody, etc. from an unillustrated sound output section may be provided.

Furthermore, the display section 16 may be configured so as to be shared by the load driving apparatus 1 and a car navigation device or a vehicle-mounted television device, for example. Moreover, a display control section for controlling the display section 16 may be provided separately from the control section 10, the control section 10 may calculate the electric power difference ΔP and output the calculation result to the display control section, and the display control section may calculate, for example, the electric power amount difference ΔW and allow the display section 16 to display the calculation result. In that case, since a plurality of components function as a calculation means, an arithmetic load can be dispersed.

Alternatively, instead of the operation section 15 having functions of the limitation receiving section and ratio receiving section, a load driving apparatus 1 may include: an operation section having the function of the limitation receiving section; and an operation section having the function of the ratio receiving section. Optionally, with the aim of receiving ON/OFF of energy-saving driving and a change in the duty ratio for each of the semiconductor relays 11 and 12, a load driving apparatus 1 may include the two operation sections 15. Alternatively, the operation section 15 may be formed by using a slide switch, or the operation section 15 may be formed by using a touch panel.

Actually, it is conceivable that when normal driving is carried out, a value indicative of an expected energy-saving effect may be displayed based on a difference between an actual load electric power consumption and an estimated electric power consumption obtained assuming that energy-saving driving is carried out, and a notification may be made about how much energy is saved if energy-saving driving is carried out. However, a notification about the expected energy-saving effect might make the driver feel as if he or she is incurring a loss by the value indicative of the expected energy-saving effect, and therefore, no notification is made about the expected energy-saving effect in the present embodiment.

Embodiment 2

In the present embodiment, a load driving apparatus 1 that provides notification of values other than the electric power amount difference ΔW as values indicative of energy-saving effects will be described.

The configuration of this load driving apparatus 1 is similar to that of the load driving apparatus 1 of Embodiment 1 illustrated in FIG. 1. Hereinafter, differences between the present embodiment and Embodiment 1 will be described; in addition, components corresponding to those of Embodiment 1 are identified by the same reference characters, and description thereof will be omitted.

In the present embodiment, specific examples of values indicative of energy-saving effects include: a fuel amount ΔF saved by carrying out energy-saving driving (which will hereinafter be referred to as a "fuel saving amount"); a $CO_2$ amount ΔG that has been reduced (which will hereinafter be referred to as a "$CO_2$ reduction amount"); and a fuel cost ΔM that has been saved (which will hereinafter be referred to as a "fuel cost saving amount").

A conversion factor for converting an electric power amount into a fuel consumption amount is defined as A[L/Wh]. In this case, the fuel saving amount ΔF is calculated using the following equation (12). It is to be noted that the conversion factor A is a constant dependent on the energy conversion efficiency or the like of an engine included in the vehicle 3 and the vehicle-mounted generator, and a value thereof obtained based on an experiment or a theory is stored in advance in the ROM 17, for example.

$$\Delta F = \Delta W \times A \quad (12)$$

Hereinafter, the reason why the fuel saving amount ΔF is calculated using the equation (12) will be described. The fuel saving amount is calculated in this manner because a load electric power consumption amount W of the entire loads 21 and 22 and a fuel consumption amount F of the loads (which will hereinafter be referred to as a "load fuel consumption amount") when energy-saving driving is carried out are calculated using the equation (6) and the following equations (13) and (14), and an estimated electric power consumption amount $W_E$ of the entire loads 21 and 22 and an estimated fuel consumption amount $F_E$, which are based on the assumption that normal driving is carried out, are calculated using the equation (9) and the following equations (15) and (16). It is to be noted that the equation (13) and the equation (15) are equations for temporal summation of the load electric power consumption P and the estimated electric power consumption $P_E$, respectively.

Accordingly, an equation for calculating the fuel saving amount ΔF will be the following equation (17). Since $\{W_E - W\} = \Delta W$, the equation (12) is obtained by modifying the equation (17).

$$W = W + P \quad (13)$$

$$F = W \times A \quad (14)$$

$$W_E = W_E + P_E \quad (15)$$

$$F_E = W_E \times A \quad (16)$$

$$\Delta F = F_E - F = W_E \times A - W \times A \quad (17)$$

A conversion factor for converting a fuel consumption amount into a $CO_2$ emission amount is defined as B[kg/L]. In this case, the $CO_2$ reduction amount ΔG is calculated using the following equation (18). It is to be noted that the conversion factor B is a constant dependent on the type of fuel, and is stored in advance in the ROM 17, for example. Specifically, in the case of using gasoline, B=2.3, and in the case of using light oil, B=2.6.

$$\Delta G = F_E \times B - F \times B = \Delta F \times B \quad (18)$$

A conversion factor for converting a fuel consumption amount into a fuel cost is defined as C[¥/L]. In this case, the fuel cost saving amount ΔM is calculated using the following equation (19). It is to be noted that the conversion factor C is a constant dependent on the type of fuel, and is changed in accordance with a market price. Accordingly, the conversion factor C has to be inputted by a user with the use of an unillustrated numeric keypad included in the load driving apparatus 1, for example. Note that when the vehicle 3 includes a car navigation device having a communication function, the conversion factor C may be received from outside via the car navigation device.

$$\Delta M = F_E \times C - F \times C = \Delta F \times C \quad (19)$$

The control section 10 carries out load driving processing similar to that of Embodiment 1 illustrated in FIGS. 2 and 3, and also carries out energy-saving effect notification procedure substantially similar to that illustrated in FIG. 4.

Upon end of the process of S48 when the energy-saving effect notification processing is carried out, the control section 10 calculates the fuel saving amount ΔF, the $CO_2$ reduction amount ΔG and the fuel cost saving amount ΔM with the use of the electric power amount difference ΔW calculated in S46, and by using the equations (12), (18) and (19), respectively.

Subsequently, the control section 10 allows the display section 16 to display the fuel saving amount ΔF, the $CO_2$ reduction amount ΔG and the fuel cost saving amount ΔM by the process of S49. In this case, the control section 10 may allow the display section 16 to also display the electric power amount difference ΔW.

The above-described load driving apparatus 1 achieves effects similar to those of the load driving apparatus 1 according to Embodiment 1. Further, since a plurality of types of values are displayed as energy-saving effect indices, the driver can use, as reference, the value by which the degree of energy saving is most easily grasped by the driver himself or herself.

Embodiment 3

The configuration of a load driving apparatus 1 according to the present embodiment is approximately similar to that of the load driving apparatus 1 according to Embodiment 1 illustrated in FIG. 1. Hereinafter, differences between the present embodiment and Embodiment 1 will be described; in addition, components corresponding to those of Embodiment 1 are identified by the same reference characters, and description thereof will be omitted.

The load driving apparatus 1 according to Embodiment 1 notifies the driver of the electric power amount difference ΔW as a value indicative of an energy-saving effect. However, the driver cannot grasp the value of the load electric power consumption amount W, which is specifically indicative of the level thereof, by merely being notified of the electric power amount difference ΔW.

To cope with this, the load driving apparatus 1 according to the present embodiment not only provides notification of a value indicative of an energy-saving effect (i.e., a value concerning a difference between a load electric power consumption and an estimated electric power consumption), but also provides notification of a value concerning the load electric power consumption concurrently. Specifically, the load driving apparatus 1 allows the display section 16 to display all of the electric power amount difference ΔW, fuel saving amount ΔF, $CO_2$ reduction amount ΔG and fuel cost saving amount ΔM, each serving as a value indicative of an energy-saving effect, and the load electric power consumption amount W, load fuel consumption amount F, $CO_2$ emission amount G and fuel cost M, each serving as a value concerning the load electric power consumption.

Furthermore, the load driving apparatus 1 according to Embodiment 1 provides, at predetermined time intervals, notification of the electric power amount difference ΔW between the predetermined times.

On the other hand, the load driving apparatus 1 according to the present embodiment provides, at predetermined time intervals, notification of a value indicative of an energy-saving effect obtained since the start of energy-saving driving, and a value concerning the load electric power consumption.

Moreover, the load driving apparatus 1 according to Embodiment 3 provides, with any timing desired by the driver, notification of a value indicative of an energy-saving effect and a value concerning the load electric power consumption. To this end, the load driving apparatus 1 further includes an illustrated notification switch.

The control section 10 carries out load driving processing substantially similar to the load driving processing according to Embodiment 1 illustrated in FIGS. 2 and 3. However, in the process of S18, the control section 10 resets the electric power amount difference ΔW to "0" and also resets the load electric power consumption amount W to "0".

Figure 5:
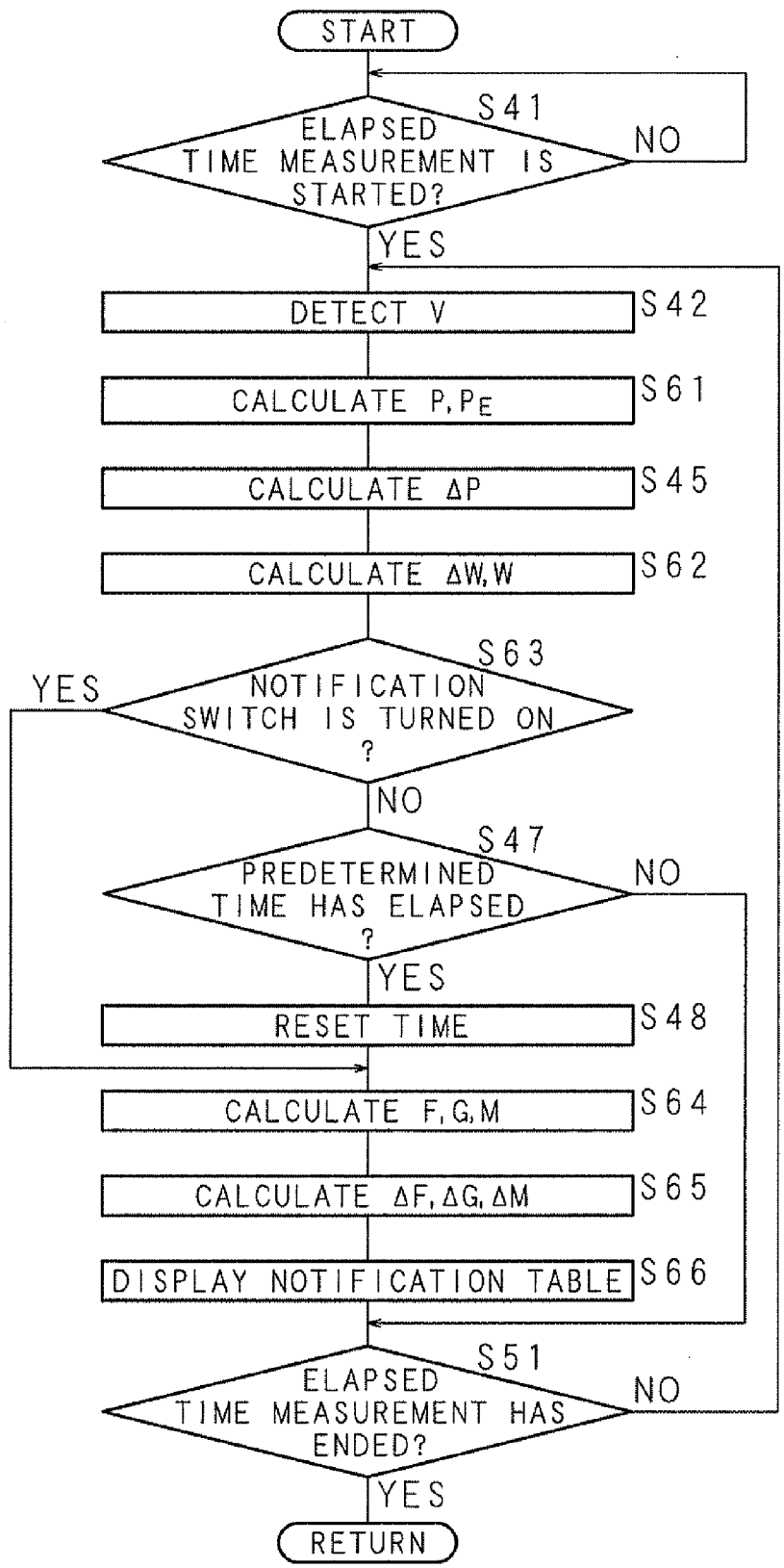
FIG. 5 is a flow chart illustrating a procedure of energy-saving effect notification processing carried out by a load driving apparatus according to Embodiment 3 of the present invention.

FIG. 5 is a flow chart illustrating a procedure of energy-saving effect notification processing carried out by the load driving apparatus 1 according to Embodiment 3 of the present invention. Processes of S41, S42, S45, S47, S48 and S51 in this chart are similar to those of Embodiment 1 illustrated in FIG. 4 and identified by the same reference characters, and therefore, the description thereof will be omitted.

After the end of the processes of S41 and S42, the control section 10 calculates the load electric power consumption P and the estimated electric power consumption $P_E$ similarly to the processes of S43 and S44 of Embodiment 1 (S61). Next, the control section 10 carries out the process of S45 and then calculates, using the equations (11) and (13), the electric power amount difference ΔW and the load electric power consumption amount W (S62).

Subsequently, the control section 10 determines whether or not the notification switch is turned ON(S63), and moves the procedure to S47 when the notification switch is kept OFF (NO in S63).

When the notification switch is turned ON (YES in S63), the control section 10 moves the procedure to S64 described later. Further, after the end of the process of S48, the control section 10 moves the procedure to S64.

Using the load electric power consumption amount W calculated in S62 and the following equations (20), (21) and (22), the control section 10 calculates the load fuel consumption amount F, the $CO_2$ emission amount G and the fuel cost M (S64).

$$F = W \times A \qquad (20)$$

$$G = F \times B \qquad (21)$$

$$M = F \times C \qquad (22)$$

Moreover, using the electric power amount difference ΔW calculated in S62 and the equations (12), (18) and (19), the control section 10 calculates the fuel saving amount ΔF, the $CO_2$ reduction amount ΔG and the fuel cost saving amount ΔM (S65).

Then, the control section 10 allows the display section 16 to display a notification table (see FIG. 6 described later) in which the respective values calculated in S62, S64 and S65 are summarized in a list (S66), and moves the procedure to S51.

Note that the notification table may be displayed only when the predetermined time has elapsed in S47, or may be displayed only when the notification switch is turned ON in S63.

FIG. 6 is a schematic diagram illustrating an example of the notification table displayed on the display section 16.

In the row "ELECTRIC POWER CONSUMPTION AMOUNT" of the diagram, the load electric power consumption amount W serving as an index of "CONSUMPTION/EMISSION DURING PRESENT DRIVING" (which is "200 Wh" in the diagram), and the electric power amount difference ΔW serving as an index of "ENERGY-SAVING EFFECT" (which is "40 Wh" in the diagram) are displayed side by side.

Similarly, the load fuel consumption amount F (which is "10 L" in the diagram) and the fuel saving amount ΔF (which is "2 L" in the diagram) are displayed in the row "FUEL CONSUMPTION", the fuel cost M (which is "1000 Yen" in the diagram) and the fuel cost saving amount ΔM (which is "200 Yen" in the diagram) are displayed in the row "FUEL EXPENSE", and the $CO_2$ emission amount G (which is "23 kg" in the diagram) and the $CO_2$ reduction amount ΔG (which is "4.6 kg" in the diagram) are displayed in the row "$CO_2$ EMISSION AMOUNT".

Accordingly, the driver who has visually recognized the notification table can easily grasp not only a value serving as an index of "ENERGY-SAVING EFFECT" but also a value serving as an index of "CONSUMPTION/EMISSION DURING PRESENT DRIVING".

In the case of using the above-described load driving apparatus 1, even if the electric power amount difference ΔW, for example, is sufficiently large, the driver can determine that the degree of energy saving is insufficient when the load electric power consumption amount W is excessively large. In such a case, the driver turns OFF the unnecessary load 21 or 22, for example, thereby making it possible to achieve further energy saving.

Note that Embodiments 1 to 3 disclosed herein should be considered to be illustrative in all respects and not restrictive. The scope of the present invention is not limited by the foregoing meaning but is intended to include meaning equivalent to the claims and all changes within the claims.

Furthermore, as long as the effects of the present invention are achieved, the load driving apparatus 1 may include a constituent element that is not disclosed in Embodiments 1 to 3.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A load driving apparatus for driving a load, comprising:
  a switching section for switching electric power supplied to the load;

an intermittent control section for controlling and intermittently turning ON the switching section, associated with the load, so as to limit the electric power supplied to the load;

a calculation section for calculating a value concerning a difference between a load electric power consumption of the load associated with the switching section when the switching section is controlled by the intermittent control section, and an estimated electric power consumption of the load when the switching section is continuously ON; and a notification section for providing notification of the value calculated by the calculation section.

2. The load driving apparatus according to claim 1, further comprising an electric current detection section for detecting a current value of an electric current flowing through the load, wherein the calculation section calculates at least the load electric power consumption based on a detection result obtained by the electric current detection section.

3. The load driving apparatus according to claim 2, wherein a semiconductor relay having a function of detecting a current value of an electric current flowing through the semiconductor relay itself serves as both of the switching section and the electric current detection section.

4. The load driving apparatus according to claim 1, further comprising a limitation receiving section for receiving limitation/non-limitation of electric power supplied to the load; and a continuous control section for controlling and continuously turning ON the switching section, associated with the load, upon reception of non-limitation by the limitation receiving section, wherein the intermittent control section controls and intermittently turns ON the switching section, associated with the load, upon reception of limitation by the limitation receiving section.

5. The load driving apparatus according to claim 1, further comprising a ratio receiving section for receiving a duty ratio used in performing PWM control, wherein the intermittent control section performs PWM control on the switching section by using the duty ratio received by the ratio receiving section.

6. The load driving apparatus according to claim 1, wherein the value concerning the difference between the load electric power consumption and the estimated electric power consumption is an electric power difference obtained by subtracting the load electric power consumption from the estimated electric power consumption or an electric power amount difference obtained by temporal summation of this electric power difference.

7. The load driving apparatus according to claim 1, wherein the load electric power consumption is obtained by multiplication of a voltage value of a voltage applied to the load, a current value of an electric current flowing through the load and an ON/OFF ratio of the switching section.

8. The load driving apparatus according to claim 1, wherein the value concerning the difference between the load electric power consumption and the estimated electric power consumption is a saved fuel amount, a reduced $CO_2$ amount or a saved fuel cost, by intermittently turning ON the switching section.

9. The load driving apparatus according to claim 1, wherein the notification section provides notification of a value concerning the load electric power consumption.

\* \* \* \* \*